United States Patent
Statler, III et al.

(10) Patent No.: US 9,022,077 B2
(45) Date of Patent: May 5, 2015

(54) COMPOSITE TUBE FOR FLUID DELIVERY SYSTEM

(75) Inventors: Richard L. Statler, III, Denver, CO (US); Clifton P. Breay, Littleton, CO (US)

(73) Assignee: Eaton Corporation, Cleveland, OH (US)

( * ) Notice: Subject to any disclaimer, the term of this patent is extended or adjusted under 35 U.S.C. 154(b) by 1162 days.

(21) Appl. No.: 12/983,069

(22) Filed: Dec. 31, 2010

(65) Prior Publication Data

US 2012/0168012 A1 Jul. 5, 2012

(51) Int. Cl.
| F16L 11/12 | (2006.01) |
| B29C 70/44 | (2006.01) |
| B29C 70/88 | (2006.01) |
| F16L 9/128 | (2006.01) |
| B29L 23/00 | (2006.01) |
| B64D 37/00 | (2006.01) |

(52) U.S. Cl.
CPC ............. *B29C 70/446* (2013.01); *B29C 70/882* (2013.01); *B29L 2023/22* (2013.01); *F16L 9/128* (2013.01); *B64D 37/005* (2013.01)

(58) Field of Classification Search
USPC ......... 138/123–125, 140, 141, 137, 153, 172, 138/174; 428/36.1, 36.9
See application file for complete search history.

(56) References Cited

U.S. PATENT DOCUMENTS

| 3,627,601 | A |  | 12/1971 | Hayes et al. |
| 3,812,885 | A |  | 5/1974 | Sajben et al. |
| 3,848,640 | A |  | 11/1974 | Crawford et al. |
| 3,874,970 | A |  | 4/1975 | Dunn |
| 3,971,233 | A |  | 7/1976 | Amaya et al. |
| 4,241,763 | A |  | 12/1980 | Antal et al. |
| 4,330,811 | A |  | 5/1982 | Bordner |
| 4,600,615 | A | * | 7/1986 | Hyodo et al. .................. 138/125 |

(Continued)

FOREIGN PATENT DOCUMENTS

| EP | 0028310 | 5/1981 |
| EP | 0391568 | 10/1990 |
| WO | WO 2009/087372 | 7/2009 |

OTHER PUBLICATIONS

Watson "Building composite tubes with WEST SYSTEM® epoxy and braided fibers," EPOXYWORKS, Spring 2008, No. 26, 3 pages.

(Continued)

*Primary Examiner* — Patrick F Brinson
(74) *Attorney, Agent, or Firm* — Sheridan Ross P.C.

(57) ABSTRACT

The composite tube comprises a tubular arrangement of knitted fiber characterized by a plurality of interlocking loops. Selected knitted patterns provide desired density or spacing between fibers. Selected fibers may include materials such as Kevlar®, carbon fiber, and combinations thereof. The tubular knitted pattern allows for variable electrical, mechanical and geometrical options. A matrix material is applied over the knitted fiber pattern and is allowed to cure. The matrix material may include a combination of resin and epoxy constituents. The matrix material may be applied by a vacuum bag molding process. Electrical and mechanical properties can also be controlled by selecting desired resin and epoxy constituents. The flexible knitted reinforcing layer allows use of an inflatable bladder to hold the reinforcing layer in the desired shape, thereby facilitating tube constructions of varying shapes and diameters. Continuous application of the matrix material avoids overlapping seams that are prone to delamination.

17 Claims, 2 Drawing Sheets

(56) References Cited

U.S. PATENT DOCUMENTS

| | | | |
|---|---|---|---|
| 4,657,623 A | | 4/1987 | Wesch |
| 4,675,780 A | | 6/1987 | Barnes et al. |
| 4,838,971 A | | 6/1989 | Cacak |
| 4,868,038 A | * | 9/1989 | McCullough et al. ........ 428/222 |
| 5,132,168 A | | 7/1992 | Meyn et al. |
| 5,472,769 A | * | 12/1995 | Goerz et al. .................. 428/138 |
| 6,315,004 B1 | | 11/2001 | Wellman et al. |
| 6,357,485 B2 | * | 3/2002 | Quigley et al. ............... 138/125 |
| 7,144,625 B2 | * | 12/2006 | Tunis ............................ 428/375 |
| 7,200,973 B2 | * | 4/2007 | Tunis ............................ 52/834 |
| 7,931,958 B2 | * | 4/2011 | Arai et al. .................. 428/297.4 |
| 2001/0025664 A1 | * | 10/2001 | Quigley et al. ............... 138/125 |
| 2009/0229452 A1 | | 9/2009 | Milwich et al. |
| 2010/0003840 A1 | | 1/2010 | Breay et al. |
| 2010/0116941 A1 | | 5/2010 | Ciolcyzk et al. |
| 2010/0147446 A1 | | 6/2010 | Ciolczyk et al. |

OTHER PUBLICATIONS

"Guide to Vacuum Bagging," Lavender, http://www.lavender-ce.com/wp-content/uploads/guide-to-vacuum-bagging.pdf, date unknown, 3 pages.

"Technology Overview," COMPOTECH Structural Composit Tubes, http://www.compotech.com/downloadfile.aspx?&dl=2, date unknown, 8 pages.

"Circular knitting," Wikipedia, http://en.wikipedia.org/wiki/Circular_ting, printed Oct. 27, 2010, 1 page.

"Knitting," Wikipedia, http://en.wikipedia.org/wiki/Knitting, printed Oct. 29, 2010, 18 pages.

\* cited by examiner

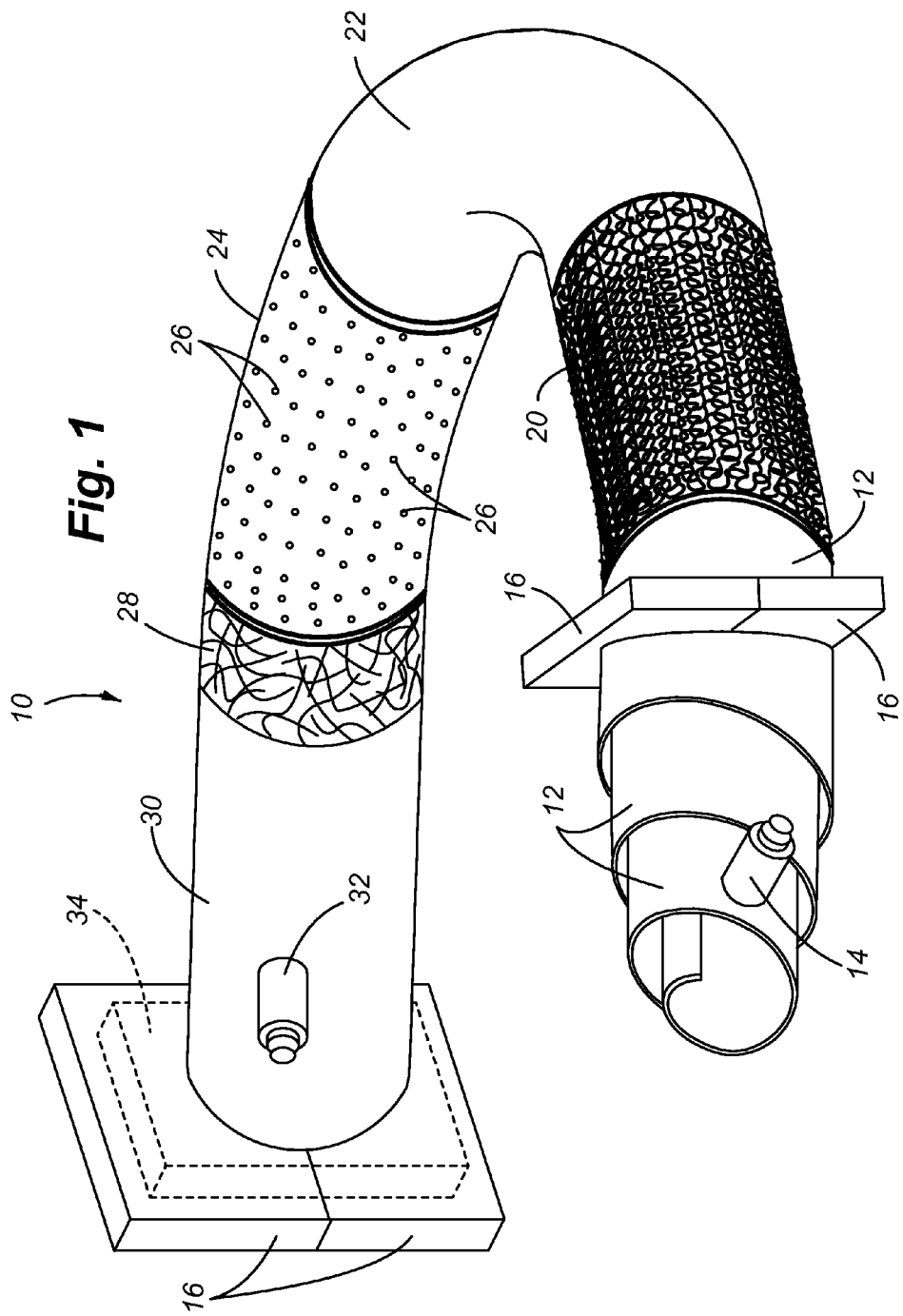

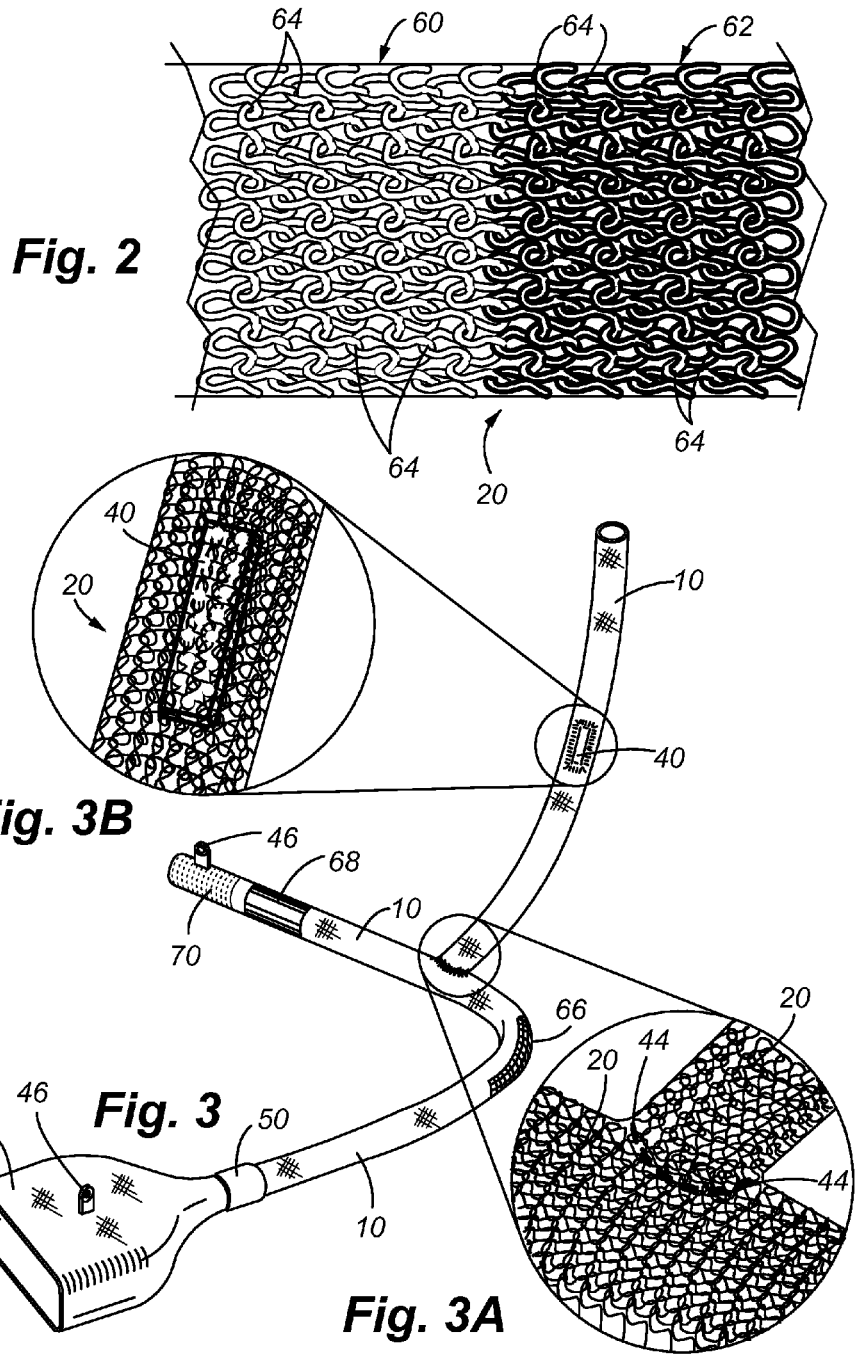

COMPOSITE TUBE FOR FLUID DELIVERY SYSTEM

FIELD OF THE INVENTION

The present invention relates to a composite tube used in fluid delivery systems, and more particularly, to a composite tube, composite tube system, and method of manufacturing a composite tube used in fluid delivery systems to include fuel systems in vehicles or aircraft.

BACKGROUND OF THE INVENTION

Polymer based compositions are becoming increasingly used in a variety of different technological applications to include vehicle and aerospace applications. Polymer based composites are used in not only structural applications, but also in construction of system components in order to control the electrical conductivity and resistivity of the components. Polymers widely vary in their ability to dissipate static charges and to prevent the composite material from acting as a mere conductor of electrical current.

Polymeric composites with both conductive and non-conductive properties can be chosen by incremental addition of selected materials such as carbon black, carbon fiber, metallic fibers and powders, as well as selecting inherently conductive polymeric compositions such as polyaniline. Further, it is known that by varying the amount of conductive or resistive particles added to the composition, some incremental control can be obtained for establishing the conductive or resistive properties of the material.

Fuel lines, particularly those used in aircraft, should preferably have the ability to accommodate a wide range of electrical performance requirements depending upon the location of the fuel line, the type of fuel line and other factors. It is desirable to have fuel lines that are resistant enough to prevent them from acting as conductors of electrical current such as caused by a lightening strike, yet the fuel lines should be conductive enough to prevent static charge build up that could result in an electrical arc creating a spark within the fuel line.

Various efforts have been made to isolate fuel lines to ensure the fuel lines maintain the desired electrical properties; however, traditional fuel lines are unable to accommodate wide electrical performance requirements when comparing an event such as a lightning strike versus slow but incremental static buildup.

One example of a reference that discloses fuel lines with controlled resistivity includes the International Publication Number WO2009/087372. This reference describes a glass reinforced composite pipe having an electrically nonconductive polymeric resin matrix and an electrically nonconductive reinforcement compenent such as glass fiber. The composition further includes a selected dispersion of an electrically conductive particulate filler, such as carbon black in which the resistivity of the outer portion of the composite pipe is preferably set between 50 K-ohms per meter length and 4 M-ohms per meter length.

Another reference that addresses electrical conductivity problems associated with fuel carrying pipes or tubes is the European Patent Application Publication No. 0028310. This reference discloses a filament reinforced plastic article having a fluid impermeable wall with a relatively low surface resistivity to prevent build up of electrostatic charge. The article includes overlapping bands of filament coated with a plastic material. A minor portion of the filament in some of the bands is electrically conductive by use of electrically conductive filaments that may be distributed throughout the wall of the article.

Another example of a fuel pipe or tube addressing desired electrical properties is the U.S. Patent Application Publication No. U.S. 2010/011,694. This reference describes ducting comprising at least one multi-layer pipe having respective inner and outer layers made of a composite plastic material, and reinforced by an electrically conductive reinforcing layer. An intermediate layer is provided for stiffening of the pipe when flexed and/or to insulate the pipe. Each of the inner and outer layers has at least one winding with contiguous turns of a material made of a composite thermoplastic. The pipe is able to discharge electrostatic build up through its inner layer, and electrical charges due to lightening are deflected away from the pipe through its outer layer.

While these references may be adequate for their intended purposes, there is still a need to provide fluid conveying tubes or pipes that are economical to manufacture, and may accommodate wide ranges of electrical specifications both for static discharge and lightening protection. Further, there is need to provide a tube or pipe construction that can be shaped and sized for many different applications. For example, there is a need to provide the capability of manufacturing fuel lines for aircraft in which the tubes can be easily sized and shaped to fit within constrained spaces.

One particular problem associated with composite tubing is delamination that can occur between joined sections of tubes or layers among tubes. The most common manufacturing practice is to simply overlap abutting edges of tube sections to be joined. Although initially these overlapping edges may provide an adequate structural connection, vibration and chemical degradation by contact of the fuel with the composite material eventually results in some degree of delamination. Particularly in pipe runs that must follow a torturous path, there may be multiple sections of tubes/pipes that are joined. In these cases, it may be impractical or impossible to use mechanical couplers at each junction due to weight and size constraints. Therefore, there is also a need to provide a composite tube construction in which long continuous pipe runs having complex shapes are created without a concern for delamination between abutting tube sections.

Although there have been advances made with respect to the chemical aspects of composite materials, most present day aircraft are still constructed with metallic tubing (such as aluminum, stainless steel, or titanium). In order to electrically tune these metallic tubes, various static discharge and electrical isolators are required, which add cost and weight to the aircraft.

SUMMARY OF THE INVENTION

In accordance with the invention, a composite tube is provided that is especially adapted for use in fluid delivery systems containing fuel or other corrosive chemical formulations. The invention further comprises a method of manufacturing the composite tube as well as a composite tube system in which a plurality of composite tubes are connected for delivery of a fluid within a larger assembly, such as a vehicle or aircraft.

The composite tube comprises a tubular arrangement of fiber created by a knitted fibrous pattern characterized by a plurality of interlocking loops. The term "knitted fiber" is defined as group of fibers that are interconnected by a plurality of consecutive loops or stitches. As each row of loops is formed, a new loop is pulled through an existing loop. Selected knitted patterns may be formed to provide the desired density or spacing between the fibers. The meandering path or course of the fibers can be adjusted in terms of spacing of the consecutive loops to achieve the desired density of fibers per unit area. As distinguished from weaving in which threads or fiber extend linearly and substantially more parallel in a lengthwise or crosswise direction, the knitted pattern of the present invention comprises fibers that follow meandering paths to form loops. The loops may be symmetric or irregular shaped. Accordingly, the course or paths of the knitted fibers have multiple directional changes to include at least one directional change of approximately 180 degrees in order to form a loop. The knitted pattern has an inherent bias or stretch/contracting capability that enables a user to further adjust the density or spacing of the fibers by selectively stretching the fibers to a desired shape. A particular knitted pattern can be chosen to also modify the desired spacing and density of the knitted fibers. Examples of different knitted patterns could include plain or pearl stitching. Other types of knitting may be used to further adjust knitted pattern parameters such as fiber density. These other types of knitting may include warp knitting, weft knitting and plaited stitching.

A number of features of the composite tube can be precisely controlled with the use of a knitted pattern. For example, different types of fiber can be knitted to adjust the conductivity or resistivity of the composite tube. Monitoring devices can also be incorporated in the knitted pattern, such as various strain gauges or other sensors.

The particular geometry of the composite tube can be made in an infinite number of shapes based on the ability to knit tubular sections in desired shapes. Not only can the diameter of the tube be changed, but also turns or bends and other features can be created. Intersecting sections of tubes can be attached by stitching the abutting faces to one another. Thus, the knitted pattern of fibers can be considered a continuous integral support structure which eliminates the requirement for overlapping sections at tube intersection points, thereby avoiding delamination between the layers of material.

A circular knitting machine can be used to create the tubular knitted patterns. One example of a circular knitting machine comprises a cylinder rotatable in one or both directions. A series of circumferentially spaced needle slots are located on a peripheral surface. A series of individually movable knitting needles are reciprocated in the associated needle slots. A series of jacks are arranged below the associated needles in an end to end relationship for reciprocating with the associated needles in the needle slots. Each of the jacks has a butt extending out of the associated needle slot. A camming mechanism includes a number of raising cams arranged to define a cam track through which each butt passes when the cylinder is rotating. The knitting can be affected whenever each butt of the jack comes in contact with the raising cams, and is thereby moved along with the associated needle upwardly in the associated needle slot. This machine is described in the U.S. Pat. No. 3,971,233, and this reference is hereby incorporated by reference for the purpose of disclosing a circular knitting machine capable of producing a tubular configuration of a knitted pattern.

The use of a conventional circular knitting machine such as used for fabrics is capable of creating the tubular arrangement of fiber in the present invention. The fiber may include materials such as Kevlar®, carbon fiber, glass, and combinations thereof. The tubular knitted pattern provides for variable electrical, mechanical, and geometrical options that are difficult if not impossible to achieve with conventional composite tube manufacturing processes.

Once the knitted pattern is completed, the composite tube is then formed by a vacuum bag molding process. In general, a vacuum bag molding process involves a two sided mold that shapes both the internal and external surfaces of an object. Typically, the interior mold or mandrel is rigid, and the exterior mold is a flexible membrane or vacuum bag. In the present invention, in lieu of a rigid inner core or mandrel, an inflatable bladder is placed within the knitted pattern to create internal pressure. Preferably, the inflatable bladder is provided in a twisted, helical pattern that ensures the inflatable bladder is capable of applying even internal pressure against the knitted pattern that may have various turns or changes in diameter. The twisted helical pattern enables the bladder to be inflated beyond just a cylindrical shape. The bladder has excess material that can fill larger spaces or may easily fit within smaller areas thereby accommodating different shaped tubes to be formed. Once the inflatable tube is in place, a polymeric matrix is applied over the knitted pattern. The matrix material flows between the gaps in the knitted pattern and the matrix material is provided in sufficient quantity to create a desired thickness based on tube specifications. Preferably, the matrix material is the combination of a composite resin and epoxy formulated with the desired properties for the particular tube application.

Once the matrix is applied, additional layers are placed over the matrix to include a perforated plastic or relief plastic layer, an absorptive layer over the perforated plastic layer, and an external impervious vacuum bag over the absorptive material. A vacuum port is provided for the drawing of a vacuum to remove air, and to thereby provide a compressive force against the matrix layer. The external pressure can be increased by placing the assembly in an autoclave which can increase the differential pressures. The excess matrix material is allowed to flow through the perforated plastic layer and is absorbed within the absorptive layer. The matrix is allowed to cure, and molding materials are then removed leaving a composite tube shell which can be trimmed and finished. Finishing may include painting, part marking, application of decals, etc.

Modular and adjustable external fixturing may be used to hold critical geometry areas on the tube such as neck downs, mount points, and end configurations. This modular/adjustable exterior fixturing can also be used to secure flanges or other hardware, and may be attached to the ends of the tube or other locations on the tube.

By controlling the electrical and mechanical properties of both the fiber material and the matrix material, the desired resistive properties can be achieved. By machining and otherwise finishing the tube, the surface and volumetric resistivity of the product can also be adjusted.

As mentioned with respect to the integral or one piece fiber knitted pattern, delamination is avoided at tube intersection points or other areas where separate tube sections are joined since the matrix material can be applied continuously across these intersection points. A continuously extending tubular fiber in combination with the continuously applied matrix material avoids all laminated seams or overlapping areas.

It is well known that most composite tubes are formed on rigid inner mandrels having limited flexibility. This reduces the available geometries for a tube to be formed because ultimately, the mandrel must be removed from the interior of the tube section. In the present invention, the shape holding feature of a tube design is built into the underlying fiber pattern itself. This method therefore allows for use of a very flexible and collapsible inner mold such as the inflatable bladder. Nevertheless, a vacuum bag molding technique can be used for necessary internal and external compressed molding, while critical exterior features and varied end configurations can be held in place by modular exterior fixturing. The manufacturing method of the invention therefore allows for extreme variability in creating tube intersections, small turn radii, varied diameters, varied shapes, and also contributes to very low tooling costs. Further, this manufacturing method allows for the construction of very long pipe runs that traditionally require many laminated seams or junctions attached by couplers. The manufacturing method also allows for electronic integration of various monitoring sensors or heating elements to control temperatures, for example to comply with anti-icing requirements for aircraft. The composite tube of the present invention provides many material advantages to include a non-metallic, a seamless composite that can be formed into an infinite number of rigid shapes, and the composite tube is tunable for fine/incremental variations of electrical and mechanical properties.

Other features and advantages of the present invention will become apparent from the detailed description taken in conjunction with the drawings.

BRIEF DESCRIPTION OF THE DRAWINGS

FIG. 1 is a perspective view of a section of composite tubing formed in accordance with a vacuum bag molding method;

FIG. 2 is a plan view of one example of a knitted pattern usable with the tubular arrangement of fiber of the present invention;

FIG. 3 is a perspective view of a finished composite tube having a plurality of features;

FIG. 3A is a greatly enlarged perspective view illustrating the knitted connection between abutting sections of tubing;

FIG. 3B is a greatly enlarged perspective view illustrating the integration of a monitoring feature in the knitted pattern, such as an electronic element.

DETAILED DESCRIPTION

Referring to FIG. 1, a method of manufacturing the composite tube of the present invention is illustrated. The composite tube 10 is formed by a vacuum bag molding process. For illustrative purposes, the successive layers of material are shown as exposed. First, a spiraled inner bladder 12 is placed within the interior opening of a knitted reinforcement layer 20. The tubular knitted pattern formed for the reinforcement layer 20 is constructed with the previously described knitted pattern having a selected group of fibers formed in a plurality of loops. The inner bladder 12 is inflated through inflation port 14, in order to expand the knitted reinforcement layer 20 to a desired diameter or shape. Additionally, the knitted reinforcement layer 20 is shown as having a bend. The reinforcement layer can be knitted with the bend. This type of knitting to produce a bend could be similar to the formation of a bend in a woven garment, such as the heel portion of a knitted sock or slipper.

Each end of the composite tube section to be formed may have external fixtures 16 secured thereto to stabilize the shape of the composite tube, and to otherwise provide a means by which external hardware may be secured to the tube structure. In the example of FIG. 1, the external fixture 16 on the left side of the diagram includes an opening for holding a piece of hardware such as a flange 34 that may be secured to the composite tube during the vacuum bag molding process. The external fixture can also be used to modify the tube shape, for example, a rigid box shaped fixture placed over an end of the tube can be used to restrict the expansion and form the final product into a tube having a geometrical shaped end with flat sides. In addition to use of fixtures on the ends of the tubes, the fixtures 16 may be placed at intermediate or interior sections of the tube between the ends in order to stabilize the shape of the tube at that intermediate location(s).

Next, a matrix layer 22 is placed over the knitted reinforcement layer 20, the matrix preferably including components of resin and epoxy materials. The matrix material is typically in a liquid form that enables the matrix layer to flow between the gaps in the knitted reinforcement layer 20, and to otherwise fully encapsulate the knitted layer 20. The amount of matrix is applied to set the desired external and internal tube diameters. The matrix layer may be applied in a number of ways, such as by an atomized spray, or by brushing the matrix layer over the knitted reinforcement layer.

After the matrix material is applied, a perforated plastic layer 24 is placed over the matrix layer 22. The perforated plastic layer 24 comprises a plurality of perforations 26 as shown.

Next an absorptive layer 28 is placed over the perforated plastic layer 24. Finally, an impermeable vacuum bag 30 is placed over the absorptive layer 28. A vacuum port 32 is formed on the vacuum bag. A vacuum is applied through the vacuum port to remove air between the layers of material, thereby resulting in an external force applied to the matrix layer 22. This external force can be increased as mentioned by placing the assembly in a pressurized chamber such as an autoclave. Excess matrix material is allowed to flow through the perforations 26, and the absorptive layer 28 absorbs a significant portion of the excess matrix material flowing through the perforations.

The composite tube is then allowed to cure, and curing may be accelerated by heating in an oven or autoclave. After curing, the external layers are stripped from the cured and hardened matrix layer. The spiraled inner bladder 12 is deflated, and then removed leaving the composite tube. The tube may then finished by polishing the exposed surfaces and painting, or the tube may be left unfinished. Although the preferred embodiment shows the use of both the absorptive and perforated layers, it shall be understood that the particular vacuum bag molding process chosen may incorporate other layers or may eliminate one or more of these layers based on the particular type of tube section to be created.

Referring to FIG. 2, one example is shown of the knitted reinforcement layer 20. The layer is characterized by one or more sets of fibers and the knitted pattern forming a plurality of interlocking loops. More specifically, FIG. 2 illustrates two sets of fibers 60 and 62, and the fibers knitted in a meandering pattern such that a plurality of loops are formed in successive rows that join at interlocking loop points 64. FIG. 2 provides an example of how different sets of fibers can be used to provide distinct boundaries for changing performance characteristics of the tube while maintaining continuous material integrity without the need to overlap layers of material. For example, the first set of fibers 60 may have greater resistive properties, while the second set of fibers 62 may have greater conductive characteristics. Each set of fibers may include different types of fibers within each set that are also selected to provide the desired electrical or mechanical characteristics, or other characteristics. Therefore, one can appreciate the ability of the knitted reinforcement layer 20 to provide precise specifications for both strength and electrical conductivity/resistivity as a function of the geometry and location.

Referring to FIG. 3, a finished composite tube, structure 10 is shown having a number of different features/characteristics. The area of the tube located at the bend 66 represents an area that may have a greater density knit pattern or additional fibers at the bend to better support the tube at that location, and also fibers knitted in a curvature that provides the bend shape. The knitted material shown at area 66 is covered by the matrix layer, but is shown as exposed for illustrative purposes in Figure 3 to denote an area having a different knit pattern. Area 68 on the tube may represent an area having either a different type of matrix material applied, a different knitted pattern, or different knitted materials, the intent being to illustrate how a very small portion of the tube can be modified in performance characteristics, yet avoids traditional overlapping layers of matrix material that are prone to delamination. Area 70 illustrates yet another change in either the knitted reinforcement layer and/or the matrix material in order to support a protruding hardware element 46. Area 40 in FIG. 3 and FIG. 3B are intended to illustrate incorporation of an electronic element such as a strain gauge or temperature monitor that can be incorporated directly into the knitted pattern, or may itself be made of a fibrous material which can be knitted directly into the knitted layer 20. The electronic element could also be one which measures electrical static buildup and voltage differentials across various portions of the tube. Such electronic elements can be used to monitor the state of the tube, such as the internal pressure, temperature, and other environmental factors. FIG. 3A illustrates the knitted reinforcement layer 20 with two intersecting tubes that are knitted together at intersecting knit line 44. At this location, sets of fibers from both sections of tube can be looped with one another for a very secure connection. When the matrix material of the matrix layer 22 is applied over the intersecting knit line 44, the matrix material is continuous and therefore a traditional laminated seam is avoided. The modified section 48 has a geometric shape that is quite different than a cylindrical tube. This section may be produced with the use of external fixtures (not shown), similar to the manner in which the fixture 16 holds the flange 34. Area 50 may represent a reinforced portion of the tube, such as by applying additional matrix material thereby thickening the tube wall and/or increasing the density of the knitted pattern. Although not shown, the tube could also be made in a very flat shape with a narrow internal cavity, this shape being referred to as a clearance flat.

In another aspect of the present invention, a composite tube system is provided for incorporation within a larger assembly such as an aircraft or vehicle. According to the system, a plurality of separate composite tubes form a fluid conveying network with tubes having various diameters, lengths, and shapes. Because of the ease with which shape and diameter modifications can be achieved, the composite tube system is highly adaptable for applications in which there are constrained spaces for mounting a fluid conveying network, such as a fuel system.

While the present invention has been set forth in various embodiments, it shall be understood that changes and modifications to the preferred embodiments can be made within the spirit and scope of the claims appended hereto.

What is claimed is:

1. A composite tube comprising:
    a tubular knitted reinforcing layer, said reinforcing layer comprising a plurality of interlocking loops of fiber formed in a plurality of rows, and adjacent rows interlocking one another to form a knitted pattern;
    a matrix applied over said reinforcing layer, said matrix comprising resin and epoxy constituents, said matrix filling voids between said loops and having an internal surface extending radially inward beyond the tubular reinforcing layer and an external surface extending radially outward beyond the reinforcing layer thereby forming the composite tube of a desired thickness and;
    said composite tube is tuned for desired electrical properties including resistivity and conductivity performance characteristics, said electrical properties including at least one of (i) an electrically conductive zone having an electrical conductivity greater than remaining portions of said tube, said conductive zone being controlled by a selection of fibers in said knitted reinforcing layer, and said conductivity zone having a definable width and length, or (ii) an electrically insulative zone having electrical insulative characteristics greater than remaining portions of said tube, said electrically insulative zone being controlled by a selection of fibers in said knitted reinforcing layer, and said insulative zone having a definable width and length.

2. The composite tube, claimed in claim 1 wherein:
    said tube has a constant diameter.

3. The composite tube, claimed in claim 1, wherein:
    said reinforcing layer has a variable diameter along a length of said tube, and at least one non-circular cross-sectional area defining at least one of a plurality of end configurations, said end configurations comprising at least one of a flange, a coupler, or a junction.

4. A composite tube comprising:
    a tubular knitted reinforcing layer, said reinforcing layer comprising a plurality of interlocking loops of fibers formed in a plurality of rows, and adjacent rows interlocking one another to form a knitted pattern;
    a matrix applied over said reinforcing layer, said matrix comprising resin and epoxy constituents, said matrix filling voids between said loops and having an internal surface extending radially inward beyond the tubular reinforcing layer and an external surface extending radially outward beyond the reinforcing layer thereby forming the composite tube of a desired thickness and;
    said composite tube is tuned for desired electrical properties including resistivity and conductivity performance characteristics; and
    said reinforcement layer comprises a first fiber knitted over a selected first length and width of the tube, and a second fiber joined to the first fiber along an interlocked boundary, the second fiber being different than the first fiber, and the second fiber knitted along a selected second length and width of the tube.

5. The composite tube, claimed in claim 4 wherein:
    the first and second fibers have different electrical properties.

6. The composite tube, claimed in claim 4, wherein:
    at least one of said first or second fibers includes selected strands of each fiber having selected electrical or mechanical properties.

7. A composite tube, claimed in claim 1, wherein:
    said knitted reinforcing layer comprises the interlocking loops arranged in a plurality of rows and columns, adjacent rows and adjacent columns being interlocked with one another, wherein fibers used to create the knitted pattern follow meandering non-parallel paths thereby forming said plurality of interlocking loops.

8. A composite tube, claimed in claim 1, wherein:
    said tube comprises two tubular sections, said first tubular section extending along a first direction, and said second tubular section extending along a second direction that intersects with said first direction, and wherein at said point of intersection, said knitted reinforcing layer comprises a knitted interface in which loops of fiber of the first tubular section interlock with loops of fiber of the second tubular section.

9. A composite tube system comprising:
a plurality of composite tube sections connected to one another to accommodate flow of a fluid through the tube sections, each of said tube sections comprising:
a tubular knitted reinforcing layer, said reinforcing layer comprising a plurality of interlocking loops of fiber formed in a plurality of rows, and adjacent rows interlocking one another to form a knitted pattern;
a matrix applied over said reinforcing layer, said matrix comprising resin and epoxy constituents, said matrix filling voids between said loops and having an internal surface extending radially inward beyond the tubular reinforcing layer and an external surface extending radially outward beyond the reinforcing layer thereby forming the composite tube of a desired thickness; and
wherein said composite tube sections are tuned for desired electrical properties including resistivity and conductivity performance characteristics, said electrical properties including at least one of (i) an electrically conductive zone having an electrical conductivity greater than remaining portions of said tube, said conductivity zone being controlled by a selection of fibers in said knitted reinforcing layer, and said conductivity zone having a definable width and length, or (ii) an electrically insulative zone having electrical insulative characteristics greater than remaining portions of said tube, said electrically insulative zone being controlled by a selection of fibers in said knitted reinforcing layer, and said insulative zone having a definable width and length.

10. The composite tube system claimed in claim 9, wherein:
said reinforcing layer has a variable diameter along a length of said tube sections, and at least one non-circular cross-sectional area defining at least one of a plurality of end configurations or intermediate configurations, said end configurations or intermediate configurations comprising at least one of a flange, a coupler, a junction or clearance flat.

11. A composite tube system comprising:
a plurality of composite tube sections connected to one another to accommodate flow of a fluid through the tube sections, each of said tube sections comprising:
a tubular knitted reinforcing layer, said reinforcing layer comprising a plurality of interlocking loops of fiber formed in a plurality of rows, and adjacent rows interlocking one another to form a knitted pattern;
a matrix applied over said reinforcing layer, said matrix comprising resin and epoxy constituents, said matrix filling voids between said loops and having an internal surface extending radially inward beyond the tubular reinforcing layer and an external surface extending radially outward beyond the reinforcing layer thereby forming the composite tube of a desired thickness;
wherein said composite tuber sections are tuned for desired electrical properties including resistivity and conductivity performance characteristics; and
said reinforcement layer comprises a first fiber knitted into a selected first length and width of the tube sections, and a second fiber joined to the first fiber along an interlocked boundary, the second fiber being different than the first fiber, and the second fiber knitted along a selected second length and width of the tube.

12. The composite tube system, claimed in claim 11 wherein:
the first and second fibers have different electrical properties.

13. The composite tube system, claimed in claim 11, wherein:
at least one of said first or second fibers includes selected strands of each fiber having selected electrically conductive or resistive properties.

14. The composite tube system, claimed in claim 9, wherein:
said knitted reinforcing layer comprises the interlocking loops, arranged in a plurality of rows and columns, adjacent rows and adjacent columns being interlocked with one another, wherein fibers used to create the knitted pattern follow meandering non-parallel paths.

15. The composite tube system, claimed in claim 9, wherein:
said tube system comprises two tubular sections, said first tubular section extending along a first direction, and said second tubular section extending along a second direction that intersects with said first direction, and wherein at said point of intersection, said knitted reinforcing layer comprises a knitted interface in which loops of fiber of the first tubular section interlock with loops of fiber of the second tubular section.

16. A composite tube comprising:
a tubular knitted reinforcing layer, said reinforcing layer comprising a plurality of interlocking loops of fiber formed in a knitted pattern;
a matrix applied over said reinforcing layer, said matrix comprising resin and epoxy constituents, said matrix filling voids between said loops and having an internal surface extending radially inward beyond the tubular reinforcing layer and an external surface extending radially outward beyond the reinforcing layer thereby forming the composite tube of a desired thickness; and
said composite tube is tuned for desired electrical properties including resistivity and conductivity performance characteristics, said electrical properties including at least one of (i) an electrically conductive zone having an electrical conductivity greater than remaining portions of said tube, said conductivity zone being controlled by a selection of fibers in said knitted reinforcing layer, or (ii) an electrically insulative zone having electrical insulative characteristics greater than remaining portions of said tube, said electrically insulative zone being controlled by a selection of fibers in said knitted reinforcing layer.

17. The composite tube, claimed in claim 16, wherein:
said reinforcing layer comprises a first fiber knitted over a selected first length and width of the tube, and a second fiber joined to the first fiber along an interlocked boundary, the second fiber being different than the first fiber, and the second fiber knitted along a selected second length and width of the tube.

* * * * *